(12) United States Patent
Finley et al.

(10) Patent No.: US 8,880,517 B2
(45) Date of Patent: Nov. 4, 2014

(54) PROPAGATING SIGNALS ACROSS A WEB GRAPH

(75) Inventors: Thomas William Finley, Bellevue, WA (US); Herbert De Melo Duarte, Redmond, WA (US); Bhuvan Middha, Bellevue, WA (US); Dehu Qi, Sammamish, WA (US); Tanton Holt Gibbs, Redmond, WA (US); Sambavi Muthukrishnan, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 13/030,541

(22) Filed: Feb. 18, 2011

(65) Prior Publication Data
US 2012/0215774 A1    Aug. 23, 2012

(51) Int. Cl.
*G06F 17/30*    (2006.01)
(52) U.S. Cl.
CPC .... *G06F 17/30663* (2013.01); *G06F 17/30864* (2013.01)
USPC .......................................................... 707/728
(58) Field of Classification Search
CPC ................................................ G06F 17/30663
USPC .......................................................... 707/728
See application file for complete search history.

(56) References Cited

U.S. PATENT DOCUMENTS

| 7,305,389 | B2 | 12/2007 | Zeng et al. |
| 7,533,094 | B2* | 5/2009 | Zhang et al. ........... 707/999.004 |
| 7,630,973 | B2 | 12/2009 | Black et al. |
| 7,793,230 | B2 | 9/2010 | Burns et al. |
| 2004/0267725 | A1 | 12/2004 | Harik |
| 2006/0018551 | A1 | 1/2006 | Patterson |
| 2006/0085395 | A1 | 4/2006 | Cradick et al. |
| 2008/0071739 | A1* | 3/2008 | Kumar et al. ..................... 707/3 |
| 2008/0091670 | A1 | 4/2008 | Ismalon |
| 2009/0234832 | A1 | 9/2009 | Gao et al. |
| 2011/0131205 | A1* | 6/2011 | Iyer et al. ...................... 707/728 |

OTHER PUBLICATIONS

"Anchor Text and the Web Graph", Retrieved on:- Nov. 18, 2010, Available at: http://nlp.stanford.edu/IR-book/html/htmledition/anchor-text-and-the-web-graph-1.html.
Broder, Andrei, et al. Graph Structure in the Web, Oct. 6, 2004. http://citeseerx.ist.psu.edu/viewdoc/download?doi=10.1.1.94.1348&rep=rep1&type=pdf.
Fujii, Atsushi, Modeling Anchor Text and Classifying Queries to Enhance Web Document Retrieval, Apr. 21-25, 2008. http://citeseerx.ist.psu.edu/viewdoc/download?doi=10.1.1.163.3619&rep=rep1&type=pdf.
Qin, Tao, et al., A Study of Relevance Propagation for Web Search , http://research.microsoft.com/en-us/um/people/taoqin/papers/qin-sigir05.pdf, published Aug. 15, 2005.
Metzler, Donald. et al., Building Enriched Document Representations using Aggregated Anchor Text http://www.isi.edu/~metzler/papers/fp094-metzler.pdf, published Jul. 19, 2009.

* cited by examiner

*Primary Examiner* — Rehana Perveen
*Assistant Examiner* — Scott A Waldron
(74) *Attorney, Agent, or Firm* — Dave Ream; Doug Barker; Micky Minhas

(57) ABSTRACT

Methods, systems, and computer-readable media for a method of propagating signals across a web graph. A signal describes a document or otherwise provides useful information about a document in a web graph. A web graph is a collection of documents that are related to one another through links, such as hyperlinks. The signals are propagated in the sense that information from the related pages is associated with the target page even though the information may not be directly found in the target page. This information may then be used by a search engine to determine that a particular page is relevant to a search query.

18 Claims, 7 Drawing Sheets

PROPAGATING SIGNALS ACROSS A WEB GRAPH

BACKGROUND

Search engines or search websites generate a set of search results that are responsive to a search query. Search engines attempt to select the most responsive documents, videos, pictures, and web pages for inclusion in the search results. A search engine matches terms in the query with terms associated with a web page to determine whether the web page matches the search result. The search engine may then rank matching web pages according to responsiveness and display the most responsive search results.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention are generally directed at a method of propagating signals across a web graph. A signal describes a document or otherwise provides useful information about a document in a web graph. A web graph is a collection of documents that are related to one another. The documents may be related to one another through links, such as hyperlinks. For example, a web page may be related to other web pages connected through a hyperlink. The signals are propagated in the sense that information from one document is associated with a description of a related document. The information may not be directly found in the target document. A search engine may use this information to determine that a target document is relevant to a search query.

BRIEF DESCRIPTION OF THE DRAWINGS

Embodiments of the invention are described in detail below with reference to the attached drawing figures, wherein.

DETAILED DESCRIPTION

Figure 1:
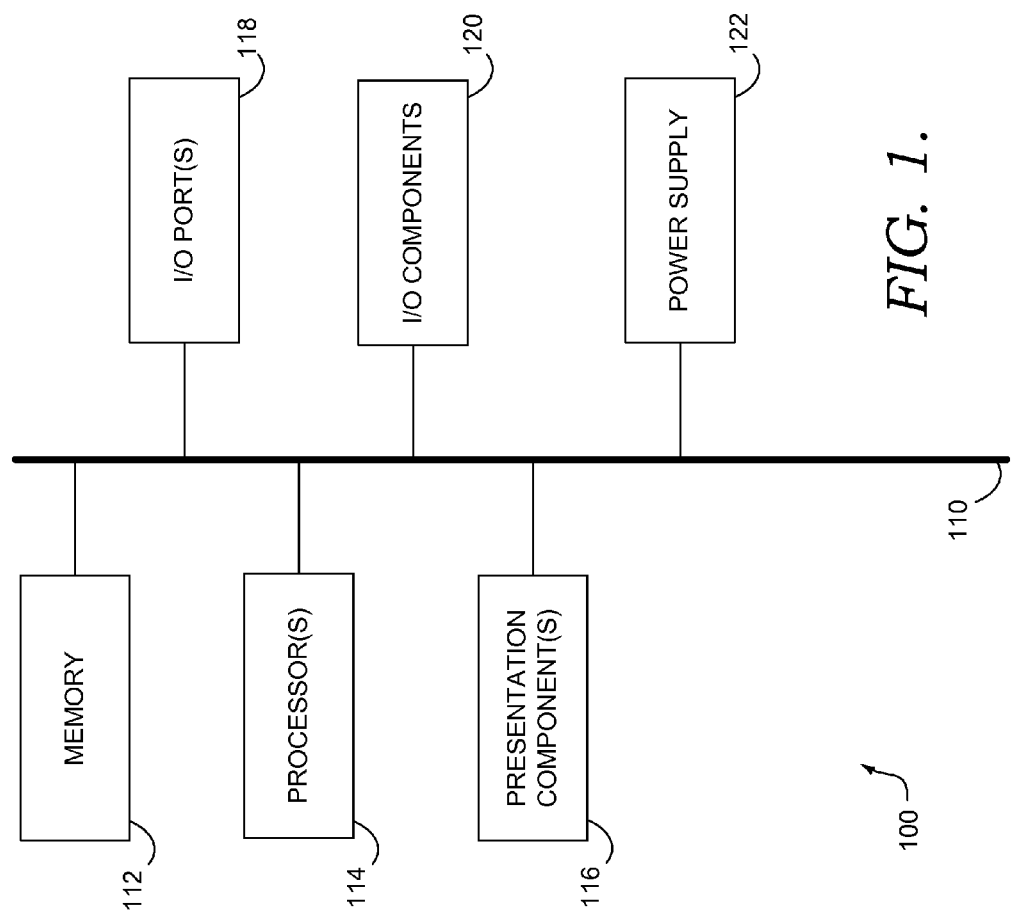
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed at a method of propagating signals across a web graph. A signal describes a document or otherwise provides useful information about a document in a web graph. A web graph is a collection of documents that are related to one another. The documents may be related to one another through links, such as hyperlinks. For example, a web page may be related to other web pages connected through a hyperlink. The signals are propagated in the sense that information from one document is associated with a description of a related document. The information may not be directly found in the target document. A search engine may use this information to determine that a target document is relevant to a search query.

Accordingly, in one embodiment, one or more computer-readable storage media having computer-executable instructions embodied thereon that when executed by a computing device perform a method of adding terms from a related document to a document description for a target document are provided. The method comprises determining that a term found in the related document does not match a filter criteria, wherein terms that match the filter criteria are not added to a document description for the target document. The document description for the target document comprises terms within a plurality of signal streams that are associated with the target document. The method also comprises calculating a similarity score for the term. The similarity score is based on cosine similarity between the target document and the related document. The method also comprises calculating a source-credibility score for the term based on a static rank of the related document. The static rank is based on an independent popularity score for the related document. The method also comprises calculating a corroboration score for the term based on similarity between terms used in links and the term. The method also comprises calculating a uniqueness score for the term based on whether the term is currently associated with the document description through other sources. The method also comprises calculating a term score for the term based on the similarity score, the source-credibility score, the corroboration score, and the uniqueness score. The method also comprises associating the term with the document description because the term score is above a threshold score.

In another embodiment, a method of associating terms from related documents with a document description of a target document, wherein the related documents are related to the target document by either a forward or backward-linking relationship is provided. The document description is used to determine whether the target document should be returned as a search result in response to a query. The method comprises calculating a similarity score for a term. The similarity score is based on similarity between the target document and a related document. The method also comprises calculating a source-credibility score for the term based on a static rank of the related document. The static rank is based on an independent popularity score for the related document. The method also comprises calculating a corroboration score for the term based on similarity between terms used in links from other documents to the related document and the term. The method also comprises calculating a uniqueness score for the term based on whether the term is currently associated with the document description through other sources. The method comprises calculating a term score for the term based on a weighted combination of the similarity score, the source-credibility score, the corroboration score, and the uniqueness score. The method also comprises associating the term with the document description because the term score is above a threshold score.

In one embodiment, one or more computer-readable storage media having computer-executable instructions embodied that when executed by a computing device perform a method of presenting search results using an anchor stream generated by propagating terms between documents that are related by links are provided. The method comprises receiving a search query comprised of one or more terms. The method also comprises determining that a target document matches the search query because at least one term of the one or more terms is associated with a target document in an anchor stream. As used in this application, the term anchor stream refers to either a forward-looking anchor stream or a backwards-looking anchor stream. The anchor stream associates terms that are not included in the target document with the target document because the terms are included in a related document and determined to be relevant to the target document. The related document is linked to or from the target document. The method also comprises presenting the target document as a search result that is responsive to the search query.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a server. Generally, program components including routines, programs, objects, components, data structures, and the like, refer to code that performs particular tasks, or implements particular abstract data types. Embodiments of the invention may be practiced in a variety of system configurations, including general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable storage media. By way of example, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100. The computer-readable storage media may be non-transitory.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, satellite dish, scanner, printer, wireless device, etc.

Exemplary System Architecture

Figure 2:
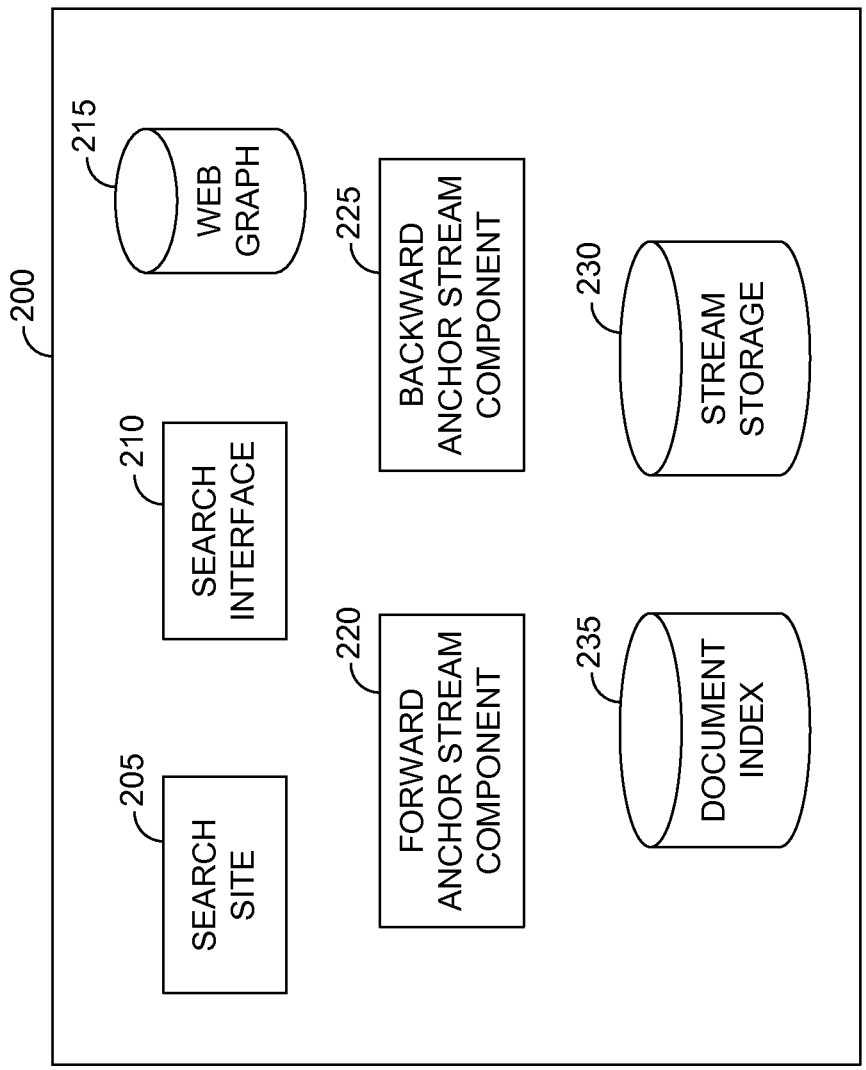
FIG. 2 is a diagram of a computing system architecture suitable for propagating signals across a web graph, in accordance with an embodiment of the present invention.

Turning now to FIG. 2, an exemplary computing system architecture 200 suitable for adding terms from a related document to a document description for a target document is provided, in accordance with an embodiment of the present invention. The computing system architecture 200 shown in FIG. 2 is an example of one suitable computing system architecture 200. The computing system architecture 200 runs on one or more computing devices similar to the computing device 100 described with reference to FIG. 1. The computing system architecture 200 should not be interpreted as having any dependency or requirement related to any single module/component or combination of modules/components illustrated therein.

The computing system architecture 200 includes a search site 205. The search site 205 (alternatively described as a search engine), a search interface 210, a web-graph data store 215, a forward anchor-stream component 220, a backward anchor-stream component 225, a stream-storage component 230, and a document index 235.

The search site 205 provides search results that are responsive to a query submitted by a user. The search site 205 may be accessed by navigating to a URL associated with a search interface. The search site 205 will display one or more search results that are responsive to the search query on the user interface. The search site 205 may also provide advertisements and other features that are related to a search query. The search site 205 may include a web crawler that traverses one or more computer networks and catalogues documents encountered. These documents may be indexed for comparison with a search query. The relationships between documents may be stored in a web graph. Links between documents may be the basis for a relationship.

The search interface component 210 generates an interface through which a search query may be submitted by a user. The search interface component 210 also presents a search-results interface and/or other search features. The search interface component 210 may allow the user to set preferences, modify a user profile, log-in, and otherwise facilitate communication of information between the user and the search site 205. In one embodiment, the search interface 210 provides different categories, or verticals, the user may select for searching. For example, the search interface 210 may allow users to search for travel, shopping information, maps, books, or other categories of information. By selecting one of these categories, the user can limit the search results to those fitting into the selected category.

The web-graph data store 215 stores one or more web graphs. A web graph describes relationships between documents. The relationships are built through links. As used throughout, an individual document being analyzed is described as the target document. Other documents may link to the target document and the target document may link to other documents. In some cases, an individual document may link to the target document and the target document may in turn link back to the individual document. A visual depiction of relationships between documents is shown in FIG. 3.

Figure 3:
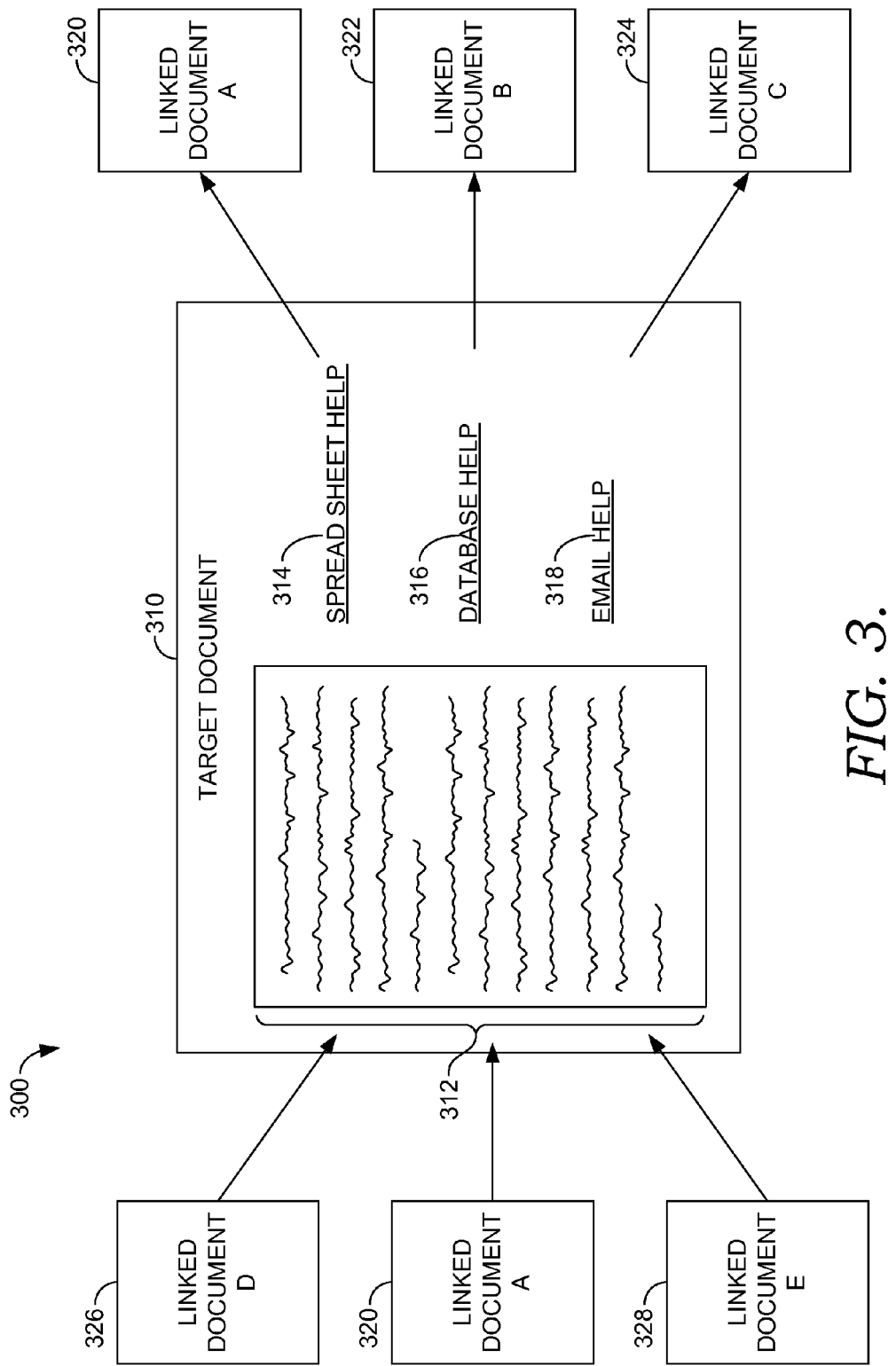
FIG. 3 is a diagram illustrating relationships between documents, in accordance with an embodiment of the present invention.

Turning now to FIG. 3, relationships between documents in a web graph 300 is visually illustrated, in accordance with an embodiment of the present invention. FIG. 3 illustrates a simple set of relationships between a target document 310 and other documents. An actual web graph of documents may contain thousands of relationships between a single document. The simple illustration shown in FIG. 3 is not intended to be limiting, only to illustrate aspects of relationships between related documents. In one embodiment, the web graph 300 describes relationships between documents published through the Internet. A web page is an example of such a document.

The web graph 300 includes a target document 310. The target document includes text 312, link 314, link 316, and link 318. The target document 310 may be a web page. The link 314 is associated with link text "spreadsheet help" and links to linked document A 320. The link 316 is associated with linked text "database help" and is linked to linked document B 322. The link 318 is associated with link text "email help" and is linked to linked document C 324. Each of link 314, 316, and 318 is described as forward links with reference to the target document 310.

The target document 310 is also associated with documents through backward links. The backward links may be ascertained through the web graph 300. The target document 310 may not contain information indicating that one or more documents link to the target document 310. The documents linked to the target document 310 through backward links include linked document D 326, linked document A 320, and linked document E 328. As can be seen, a single document (i.e., linked document A 320) may be both linked to a target document 310 through a forward link and a backward link.

As will be described in greater detail subsequently, information from related documents 320, 322, and 324 may be associated with the target document 310 within a forward-looking anchor stream. Information from related document 326, 320, and 328 may be associated with the target document 310 through a backward-looking anchor stream.

Returning to FIG. 2, the forward anchor-stream component 220 analyzes the web graph and builds a forward-looking anchor stream. The forward-looking anchor stream includes a plurality of terms. Each term within the anchor stream may be associated with one or more documents within a web graph. The forward anchor-stream component 220 uses multiple criteria to determine whether a term in a related document should be associated with a target document. Again, related documents are those associated with the target document through a forward link for the forward anchor-stream. The criteria used to determine whether a term should be associated with a target document is described within the description of FIG. 6.

The backward anchor-stream component 225 builds a backward-looking anchor stream. The backward-looking anchor stream is similar to the forward-looking anchor stream described previously except that the terms from documents that are related through a backwards relationship with the target document are associated with the target documents. The criteria used to associate terms with a base document may be similar to those used to generate the forward-looking anchor stream. In one embodiment, the weighting given to different criteria in making a determination whether to associate a term with a target document is different depending on whether the forward or backward-looking anchor stream is being built.

The stream-storage component 230 stores the forward-looking anchor stream and the backward-looking anchor stream. As used in this application, the term anchor stream refers to either a forward-looking anchor stream or a backwards-looking anchor stream. Additional signal streams may be stored in the stream-storage component 230. Examples of additional signal streams include a content signal stream, a title-word signal stream, a metadata signal stream, a click signal stream, and spam-rank signal stream. The title signal stream associates terms used in a document's title with the document. The content signal stream associates terms used within a document's content with the document. The click stream may associate words within a search query to a document clicked on in response to being presented in response to the search query.

The document index 235 stores additional information about documents contained within the web graph. Information that may be included within the document index is illustrated in FIG. 4.

Figures 4, 5:
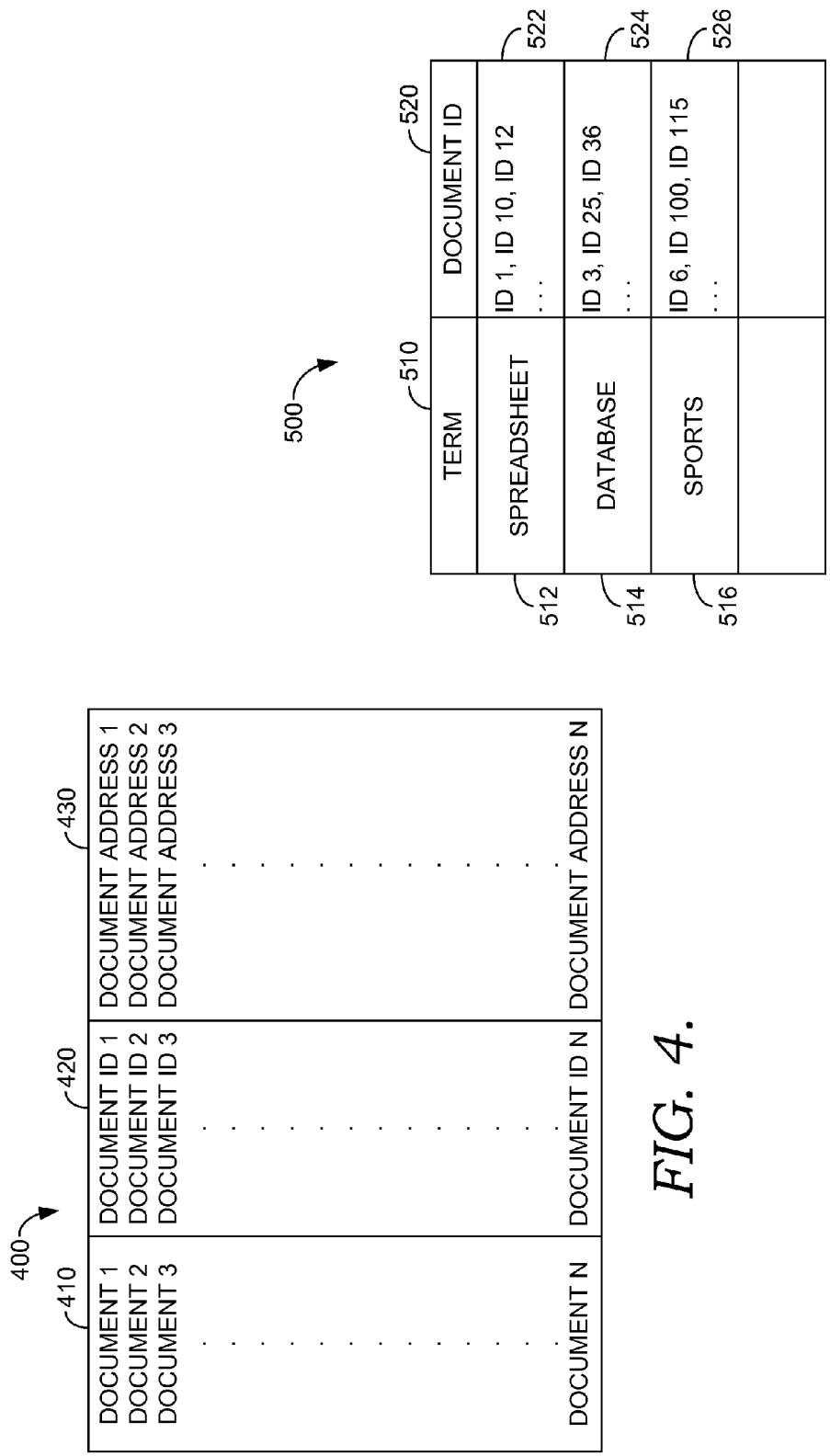
FIG. 4 is a table illustrating content within a document index, in accordance with an embodiment of the present invention.
FIG. 5 is a table illustrating content within an anchor stream, in accordance with an embodiment of the present invention.

Turning now to FIG. 4, an exemplary document index 400 is illustrated, in accordance with an embodiment of the present invention. The exemplary document index 400 includes a column 410 of document names, document 1, document 2, document 3, through document N. Column 420 includes the document ID associated with the documents and column 430 includes a document address or location associated with the document. This is a simplified document index and an actual document index could include additional information such as a document's publication date, author, and other such information.

Turning now to FIG. 5, an exemplary signal stream is illustrated, in accordance with an embodiment of the present invention. The signal stream 500 includes a column of terms 510 and a column of document IDs 520. Each term is associated with one or more document IDs. For example, the first term "spreadsheet" 512 is associated with a first group of document IDs 522. The second term 514 "database" is associated with a different plurality of document IDs 524. The third term 516 "sports" is associated with a third plurality of document IDs 526. A search engine can use the signal stream to match terms in the query with terms associated with a document through the document ID. In one embodiment, a search engine uses a single signal stream to determine whether a document matches a query. In other words, the words within the query must be associated with a matching document through a single signal stream. In another embodiment, a document is determined to match a search query if the terms in the search query are associated with the document in one or more of the signal streams.

Figure 6:
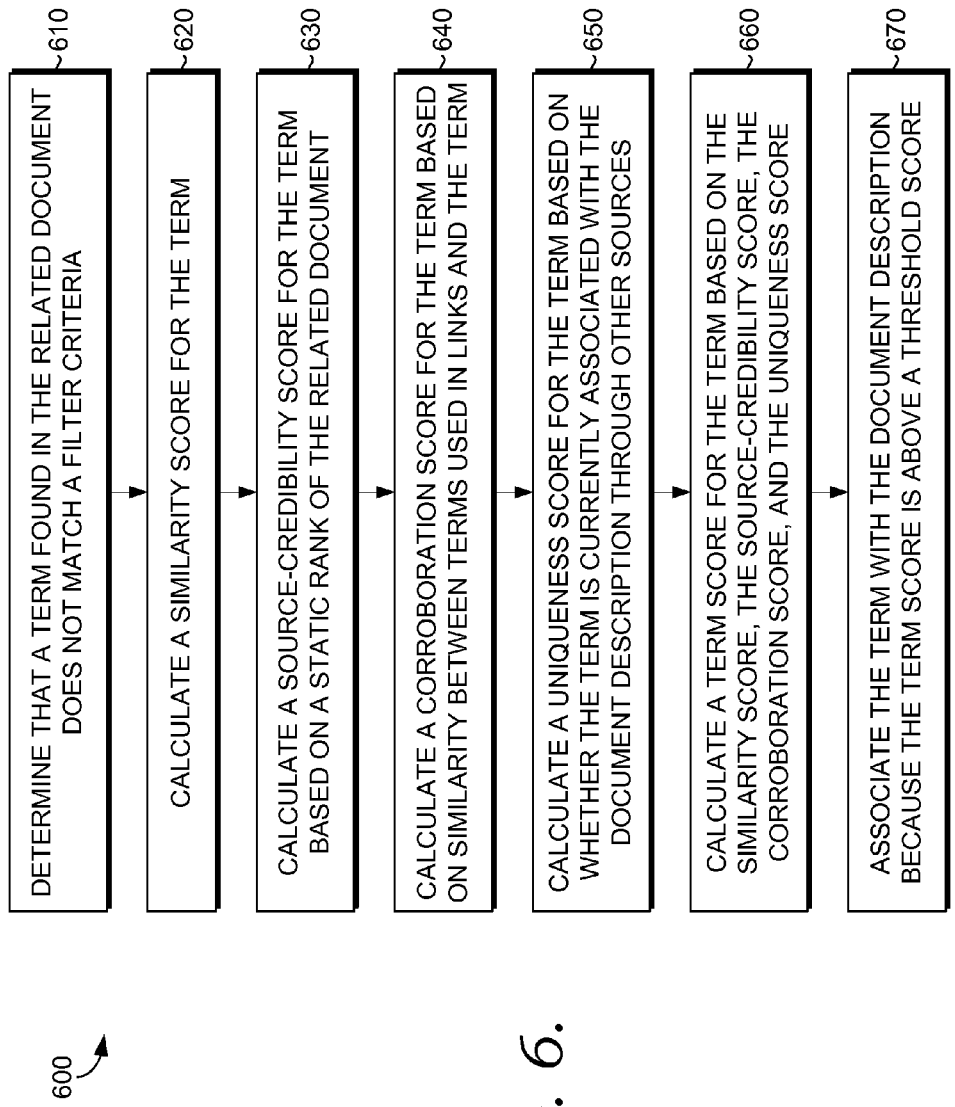
FIG. 6 is a flow diagram illustrating a method of adding terms from a related document to a document description for a document, in accordance with an embodiment of the present invention.

Turning now to FIG. 6, a flow chart illustrating a method 600 of adding terms from a related document to a document description for a target document is described, in accordance with an embodiment of the present invention. As described previously, the target document is a document to which other documents are related through a forward or backward link. The relationship between documents may be determined by analyzing a web graph containing the documents.

At step 610, a term found in the related document is determined not to match a filter criteria. Terms that match the filter criteria are not added to a document description. Accordingly, the fact that a term found in a related document is determined not to match the filter criteria means that the term has overcome the first hurdle to be associated with the target document. The document description comprises a plurality of signals that describe a document. The signals may be stored in one or more signal streams. Each signal stream that includes terms associated with the document may be part of the document description.

In one embodiment, the filter criteria comprises a list of common words that are excluded from a signal stream. For example, extremely common words may not be useful in determining the relevance of a target document. Excluding extremely common words from further analysis prevents a signal stream from being populated with low-value terms.

In another embodiment, the filter criteria excludes terms from all related documents when a target document links to greater than a threshold number of other documents. When a target document links to a large number of other documents, terms found within these other documents may not add much descriptive value to the target document.

Upon determining that the term does not match the filter criteria, further analysis occurs to determine whether the term should be added to a document description of the target document. Again, the term may be added to the target document's description by including it in a signal stream and associating it with the target document within the signal stream.

At step 620, a similarity score is calculated for the term. The similarity score may be based on cosine similarity between the base document and the related document. Cosine similarity measures similarity between terms or documents by calculating the cosine of an angle between vectors that describe the terms or documents. When the angle is small, this indicates that the vectors are pointing in a similar direction and the terms/documents associated with the vectors are similar. In general, the greater similarity between the documents suggests that a term in a related document is more likely to be relevant to the target document. For example, the term from a similar document may be another way of describing the content in the target document.

At step 630, a corroboration score is calculated for the term based on similarity between terms used in links to the related document and the term. A strong relationship or similarity between terms in a link and the term indicates that the term is closely associated with the target document.

At step 640, a uniqueness score is calculated for the term based on whether the term is currently associated with the document description through other sources. The other sources may be other signal streams. In one embodiment, when the term is unique among all of the signal streams associated with the document, then the uniqueness suggests including the term in the document's description. Including a unique term in the document's description may allow the target document to be returned as a search result when it otherwise would not be associated with the terms in the search query.

At step 650, a term score is calculated for the term based on the similarity score, the source-credibility score, the corroboration score, and the uniqueness score. In one embodiment, the various scores may not be given equal weight in the term score calculation. In one embodiment, the weighting given to the different scores is determined through a machine-learning algorithm. The machine-learning algorithm may be trained with human training data that indicates whether a particular term from a related document is actually relevant to a target document. The machine-learning algorithm then analyzes the various scores and combines them with a weighting that produces an accurate reflection of the term's relevance to a target document.

At step 660, the term is associated with the document description because the term score is above a threshold score. The threshold score may be a static number. For example, on a scale of 1 to 10, the threshold score may be an 8 and any term with a term score above 8 is then associated with the document description for the target document. In another embodiment, the threshold score is dynamic based on an overall number of terms evaluated for a particular target document. For example, the top 20 terms may be included in the document description for the target document. In this example, the threshold score would be the score of the 20th ranked term. No terms below the 20th ranked term would be included in the document description in this example.

Figure 7:
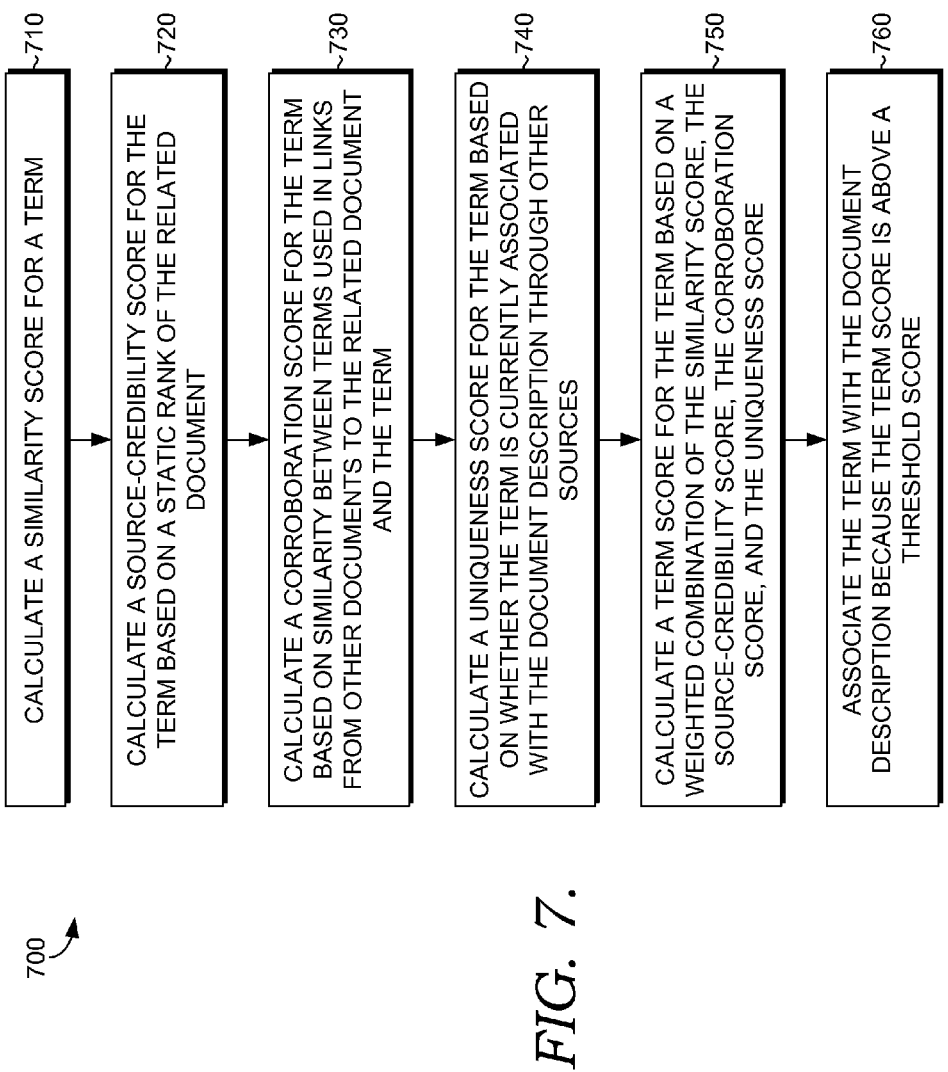
FIG. 7 is a flow diagram illustrating a method of associating terms from related documents with a document description of a document, in accordance with an embodiment of the present invention.

Turning now to FIG. 7, a method 700 of associating terms from related documents with a document description of a target document is described, in accordance with an embodiment of the present invention. As described previously, the related documents are related to the target document by either a forward or backward-linking relationship. The document description is used to determine whether the target document should be returned as a search result in response to the query.

Determining whether a document should be returned as a result of a search result in response to a query may be a two-part analysis. The first part may be to determine whether the target document matches the search query. The second part of the analysis may be the degree of relevance the target document has to the search query. Different documents may be more relevant than others. In other words, all documents that match the search query may not be presented just because they match the search query. A search engine seeks to present the most relevant documents. The document description may be used for both the matching determination and the relevancy determination.

As described previously, the document description may comprise a plurality of signal streams. In particular, the signal streams may include a forward-anchoring signal stream and a backward-anchoring signal stream. The forward-anchoring signal stream associates terms from forward-related documents to a target document. The backward-looking anchor stream associates terms from documents that link to the target document. As used in this application, the term anchor stream refers to either a forward-looking anchor stream or a backwards-looking anchor stream.

At step 710, a similarity score for the term is calculated. The similarity score is based on a similarity between the target document and the link document. The similarity between the documents may be determined by calculating a cosine similarity for the documents. As described previously, a similarity between the documents suggests that the term should be included in the document description.

At step 720, a source-credibility score for the term is calculated based on a static rank of the related document. The static rank is based on an independent popularity score for the related document. The popularity score for the related document may be generated based on the number of other pages that link to the related document. The static rank and popularity score could also be based on the traffic to the related document or other factors.

At step 730, a corroboration score for the term is calculated based on similarity between terms used in links from other documents to the linked-to document and the term. Links from other documents to the linked-to document encompasses links found on the target document to other documents and links found on other documents to the target document. For example, if the term help was used in a link and the term being evaluated was "assistance," then the potential similarity between these terms could result in a high corroboration score. In this usage, a high corroboration score indicates that the term should be included in the target document's description.

At step 740, a uniqueness score is calculated for the term based on whether the term is currently associated with the document description through other sources. The uniqueness score has been described previously with reference to FIG. 6. At step 750, a term score is calculated for the term based on a weighted combination of the similarity score, the source-credibility score, the corroboration score, and the uniqueness score. At step 760, the term is associated with the document description because the term score is above a threshold score.

Figure 8:
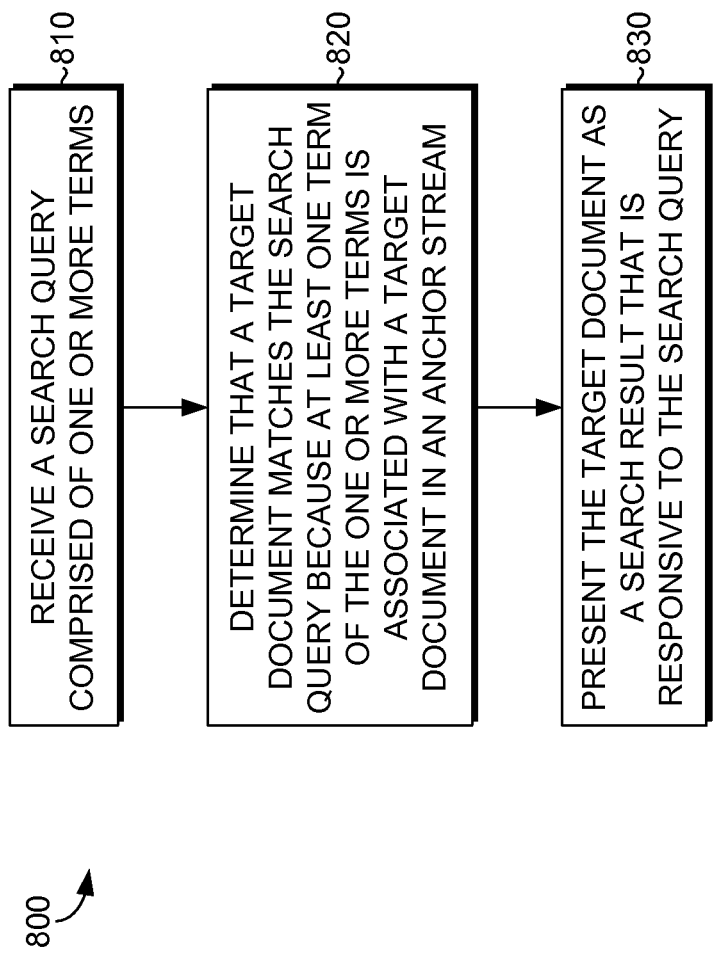
FIG. 8 is a flow diagram illustrating a method of presenting search results using an anchor stream generated by propagating terms between documents that are related by links, in accordance with an embodiment of the present invention.

Turning now to FIG. 8, a method 800 of presenting search results using an anchor stream generated by propagating terms between documents that are related by links is described, in accordance with an embodiment of the present invention. As stated previously, the term anchor stream refers to either a forward-looking anchor stream or a backwards-looking anchor stream. At step 810, a search query is received. The search query is comprised of one or more terms. The search query may be received through a search interface presented by a search engine through the worldwide web.

At step 820, a target document is determined to match the search query because at least one term of the one or more terms in the search query is associated with the target document in an anchor stream. The anchor stream may be a forward-looking anchor stream or a backward-looking anchor stream. In one embodiment, the threshold amount of words needed to determine that the target document matches the search query are all associated with the target document through the anchor stream. In another embodiment, at least one word needed to determine that the target document matches the search query is associated with the target document through the anchor stream and other words needed to determine that the target document matches the search query are associated with the target document in additional signal streams. In other words, signal streams may be used in isolation to determine that a document matches the search query or they may be used in combination with each other. In one embodiment, the anchor stream associates terms with the target document because the term is not included in the target document and is determined to be related to the target document using various criteria. As described previously, the related documents are related through links to or from the target document.

At step 830, the target document is presented as a search result that is responsive to the search query.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of adding terms from a related document to a document description for a target document, the method comprising:

determining that a term found in the related document does not match a filter criteria, wherein terms that match the filter criteria are not added to a document description for the target document, wherein the document description for the target document comprises terms within a plurality of signal streams that are associated with the target document, wherein the related document is related because the target document comprises hyperlinks to the related document;

calculating a similarity score for the term, wherein the similarity score is based on cosine similarity between terms of the target document and terms of the related document;

calculating a corroboration score for the term based on similarity between terms used in hyperlinks to the related document and the term;

calculating a uniqueness score for the term based on whether the term is currently associated with the document description through other signal streams of the plurality of signal streams;

calculating a term score for the term based on the similarity score, the corroboration score, and the uniqueness score; and associating the term with the document description because the term score is above a threshold score.

2. The method of claim 1, wherein the filter criteria comprise a list of common words that are excluded.

3. The method of claim 1, wherein the filter criteria exclude terms from all related documents when the target document links to greater than a threshold number of other documents.

4. The method of claim 1, wherein the similarity score is also based on similarity between the term and one or more terms used in a hyperlink from a related document to the target document.

5. The method of claim 1, wherein calculating the term score for the term further comprises using a weighting factor for each of the similarity score, the source credibility score, the corroboration score, and the uniqueness score.

6. The method of claim 1, wherein the threshold score is determined by ranking term scores calculated for each of a plurality of terms in the linked to document.

7. A method of associating terms from related documents with a document description of a target document, wherein the related documents are related to the target document by either a forward or backward-linking relationship, and wherein the document description comprises terms within a plurality of signal streams that are associated with the target document and is used to determine whether the target document should be returned as a search result in response to a query, the method comprising:

calculating a similarity score for a term, wherein the similarity score is based on similarity between terms of the target document and terms of a related document;

calculating a corroboration score for the term based on similarity between terms used in hyperlinks from the related documents to the target document and the term;

calculating a uniqueness score for the term based on whether the term is currently associated with the document description through other signal streams of the plurality of signal streams;

calculating a term score for the term based on a weighted combination of the similarity score, the source credibility score, the corroboration score, and the uniqueness score; and associating the term with the document description because the term score is above a threshold score.

8. The method of claim 7, wherein the method further comprises determining that the term found in the related document does not match a filter criteria, wherein terms that match the filter criteria are not added to the document description wherein the filter criteria comprise a list of common words that are excluded.

9. The method of claim 7, wherein the method further comprises generating weights for the term score using a machine learning algorithm.

10. The method of claim 7, wherein the similarity score is also based on similarity between the term and one or more terms used in a hyperlink from the related document to the target document.

11. The method of claim 7, wherein the similarity score is calculated using cosine similarity.

12. The method of claim 7, wherein calculating the term score for the term further comprises using a weighting factor for each of the similarity score, the corroboration score, and the uniqueness score.

13. The method of claim 7, wherein the threshold score is determined by ranking term scores calculated for each of a plurality of terms in the related document.

14. A method of presenting search results using an anchor stream generated by propagating terms between documents that are related by hyperlinks, the method comprising:

receiving a search query comprised of one or more terms;

determining that a target document matches the search query because at least one term of the one or more terms is associated with the target document in an anchor stream, wherein the anchor stream associates terms that are not included in the target document with the target document because the terms are included in a related document and determined to be relevant to the target document, and wherein the related document is linked from the target document;

determining that the target document matches the search query because the at least one term of the one or more terms is associated with the target document in a signal stream, wherein the signal stream associates terms that are included in the target document with the target document; and presenting the target document as a search result that is responsive to the search query.

15. The method of claim 14, wherein the method further comprises determining a responsiveness rank for the target document using the anchor stream, wherein the responsiveness rank describes a degree of relevance of the target document to the search guery as compared to other related documents.

16. The method of claim 14, wherein the anchor stream is a backward-looking anchor stream that associates terms from a different document, which links to the target document, with the target document.

17. The method of claim 14, wherein determining that the target document matches the search query because the at least one term of the one or more terms is associated with the target document in the anchor stream also comprises determining that the at least one term of the one or more terms is associated with the target document in a content stream, wherein the content stream associates terms found in the target document's content with the target document.

18. The method of claim 14, wherein the anchor stream is a forward-looking anchor stream that associates terms from a different document, which is linked from the target document, with the target document.

\* \* \* \* \*